US007693490B2

(12) United States Patent
Gagnon et al.

(10) Patent No.: US 7,693,490 B2
(45) Date of Patent: Apr. 6, 2010

(54) MULTI-EQUALIZATION METHOD AND APPARATUS

(75) Inventors: François Gagnon, Lachine (CA); Yvon Savaria, Montreal (CA); Philippe Dumais, Montreal (CA); Mohamed Lassaad Ammari, Montreal (CA); Claude Thibeault, Brossard (CA)

(73) Assignee: Ecole de Technologie Superieure Polyvalor, Limited Partnership, Montreal, Quebec (CA)

( * ) Notice: Subject to any disclaimer, the term of this patent is extended or adjusted under 35 U.S.C. 154(b) by 407 days.

(21) Appl. No.: 11/690,468

(22) Filed: Mar. 23, 2007

(65) Prior Publication Data
US 2007/0293147 A1 Dec. 20, 2007

Related U.S. Application Data

(63) Continuation of application No. PCT/CA2005/001465, filed on Sep. 26, 2005.

(60) Provisional application No. 60/612,513, filed on Sep. 24, 2004.

(51) Int. Cl.
H04B 1/00 (2006.01)

(52) U.S. Cl. .................................. 455/65; 455/3.06

(58) Field of Classification Search .................. 455/65, 455/3.06
See application file for complete search history.

(56) References Cited

U.S. PATENT DOCUMENTS 5,257,265 A * 10/1993 Su et al. ..................... 375/233
5,483,557 A   1/1996 Webb
5,670,916 A   9/1997 Korn
5,708,703 A   1/1998 Nagaraj
5,787,118 A   7/1998 Ueda
5,844,941 A   12/1998 Mack et al.
6,016,379 A   1/2000 Bülow
6,084,926 A   7/2000 Zak et al.
6,304,599 B1  10/2001 Igarashi
6,560,278 B2  5/2003 Kubo et al.
6,763,074 B1  7/2004 Yang (Continued)

FOREIGN PATENT DOCUMENTS

EP        1092280         7/2003

OTHER PUBLICATIONS

International Search Report dated Jan. 17, 2006 from the international application PCT/CA2005/001465.
Dumais et al., "Multi-Equalization a Powerful Adaptative Filtering for Time Varying Wireless Channels", Department of Electrical Engineering, Ecole de Technologie Superieure, Montreal, Canada, Fall 2004.

Primary Examiner—Matthew D Anderson
Assistant Examiner—David Bilodeau
(74) Attorney, Agent, or Firm—Ogilvy Renault LLP

(57) ABSTRACT

A method and apparatus is disclosed for performing a multi-equalization of a transmitted signal on a channel having varying characteristics comprising equalizing the transmitted signal using a plurality of setting defining a plurality of equalizing functions to provide a corresponding plurality of symbol signal, synchronizing each of the plurality of symbol signals to provide a plurality of synchronized signals, selecting at least one of the plurality of synchronized signals according to at least one transmission performance criterion and providing the selected one of the plurality of synchronized signals.

18 Claims, 4 Drawing Sheets

U.S. PATENT DOCUMENTS

| | | |
|---|---|---|
| 2003/0093809 A1 | 5/2003 | Shu et al. |
| 2004/0037354 A1 | 2/2004 | Jayaraman et al. |
| 2004/0086276 A1* | 5/2004 | Lenosky et al. ............... 398/39 |
| 2004/0228399 A1* | 11/2004 | Fimoff et al. ................ 375/233 |
| 2007/0025434 A1* | 2/2007 | Sternberg et al. ............ 375/229 |
| 2007/0064787 A1* | 3/2007 | Jaussi et al. .................. 375/232 |

* cited by examiner

MULTI-EQUALIZATION METHOD AND APPARATUS

TECHNICAL FIELD

This invention relates to the field of telecommunications. More precisely, this invention pertains to the field of equalizers.

BACKGROUND OF THE INVENTION

Channel equalization is known to be a powerful technique to reduce intersymbol interferences (ISI) caused by multipath propagation phenomenons as well as amplitude or phase distortions. For several years, the use of equalizers led to high numerical complexity filters. However the evolution of microelectronics offers today the possibility to design much more complex equalizers at a relatively low cost in terms of power or silicon surface consumption.

High quality filters are needed for wireless communication systems which are used over a wide range of link configurations. In these communication systems, channel equalization consists of an adaptive filtering algorithm.

Unfortunately, choosing the optimal filtering structure depends on channel characteristics that are often unknown a priori and time varying. Even if channel characteristics are known or estimated, it is very difficult to select the optimal equalizer and to predict the converging properties or the channel tracking capabilities of any equalizer.

There is a need for a method and apparatus that will overcome the above-identified drawbacks.

SUMMARY OF THE INVENTION

It is an object of the invention to provide a method and apparatus for equalizing a transmitted signal in the case where channel characteristics change.

According to a first aspect of the invention, there is provided a multi-equalizer unit for improving signal transmission of a signal transmitted on a channel having varying characteristics, the multi-equalizer unit comprising at least two equalizers, each receiving the transmitted signal, equalizing and providing a corresponding plurality of symbol signals, a synchronization unit receiving each of the corresponding plurality of symbol signals and providing a plurality of synchronized signals and a decision unit receiving the plurality of synchronized signals and selecting at least one of the synchronized signals according to at least one transmission performance criterion.

According to another aspect of the invention, there is provided a method for improving signal transmission of a signal transmitted on a channel having varying characteristics, the method comprising equalizing the transmitted signal using a plurality of setting defining a plurality of equalizing functions to provide a corresponding plurality of symbol signals, synchronizing each of the plurality of symbol signals to provide a plurality of synchronized signals, selecting at least one of the plurality of synchronized signals according to at least one transmission performance criterion and providing said selected one of the plurality of synchronized signals.

According to another aspect of the invention, there is provided a software defined radio comprising a receiver for receiving a signal transmitted on a channel having varying characteristics, and a multi-equalizer unit for improving signal transmission of the transmitted signal. The multi-equalizer unit is the one described above.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
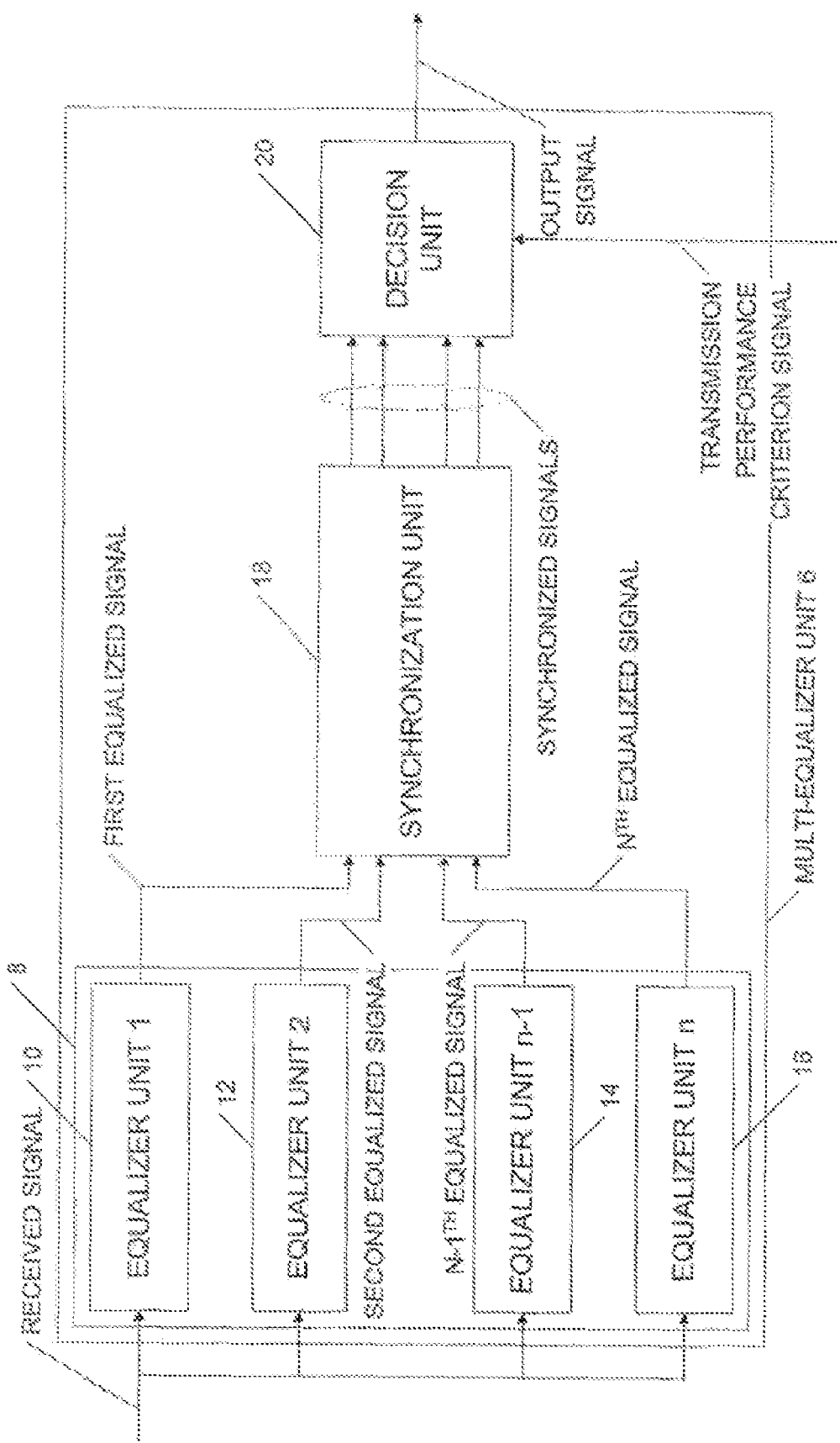
FIG. 1 is a block diagram showing a multi-equalizer unit according to an embodiment wherein n equalizers are used.

FIG. 1 shows a multi-equalizer unit 6 according to an embodiment.

The multi-equalizer unit 6 comprises a plurality of equalizer units 8, a synchronization unit 18 and a decision unit 20.

More precisely, the plurality of equalizer units 8 comprises a first equalization unit 10, a second equalization unit 12, a $n-1^{th}$ equalization unit 14 and a $n^{th}$ equalization unit 16. It will be appreciated that n is larger or equal to 2.

Each of the plurality of equalizer units 8 receives a transmitted signal and performs an equalization of the transmitted signal according to a corresponding setting defining an equalizing function.

The first equalization unit 10 receives the transmitted signal and provides a first equalized signal comprising a first given plurality of symbol signals, while the second equalization unit 12 receives the transmitted signal and provides a second equalized signal comprising a second given plurality of symbol signals. The $n-1^{th}$ equalization unit 14 receives the transmitted signal and provides a $n-1^{th}$ equalized signal comprising a $n-1^{th}$ given plurality of symbol signals and the $n^{th}$ equalization unit 16 receives the transmitted signal and provides a $n^{th}$ equalized signal comprising a $n^{th}$ given plurality of symbol signals.

It will be appreciated that each of the plurality of equalizer units 8 needs to be complementary in order to increase the global efficiency of the multi-equalizer unit 6.

The skilled addressee will further appreciate that in order to design a wireless communication link, many channel parameters have to be taken into account. The fluctuations of the delay profile represents an important factor to be considered. When channel echoes are long, an equalizer must have a long impulse response. Such an equalizer converges slowly and involves an increase in the computation complexity. Furthermore, long equalizers are not efficient when fast fading occurs.

The synchronization unit 18 receives the first equalized signal, the second equalized signal, the $n-1^{th}$ equalized signal and the $n^{th}$ equalized signal and provides a plurality of corresponding synchronized signals. In fact, a time synchronization of the received signals is performed by the synchronizing unit 18.

The decision unit 20 receives each of the corresponding synchronized signals and at least one transmission performance criterion signal and provides an output signal corresponding to at least one of the corresponding synchronized signals matching the at least one transmission performance criterion signal. In an embodiment, more than one transmission performance criterion signal may be used. Also, in an embodiment, it is possible to use a combination of the corresponding synchronized signals in order to provide a more reliable decision. One way of doing this for instance consists of using the most probable transmitted symbol detected for each of the plurality of equalizers 8, and producing global data using a majority, or a weighted majority algorithm.

Figure 2:
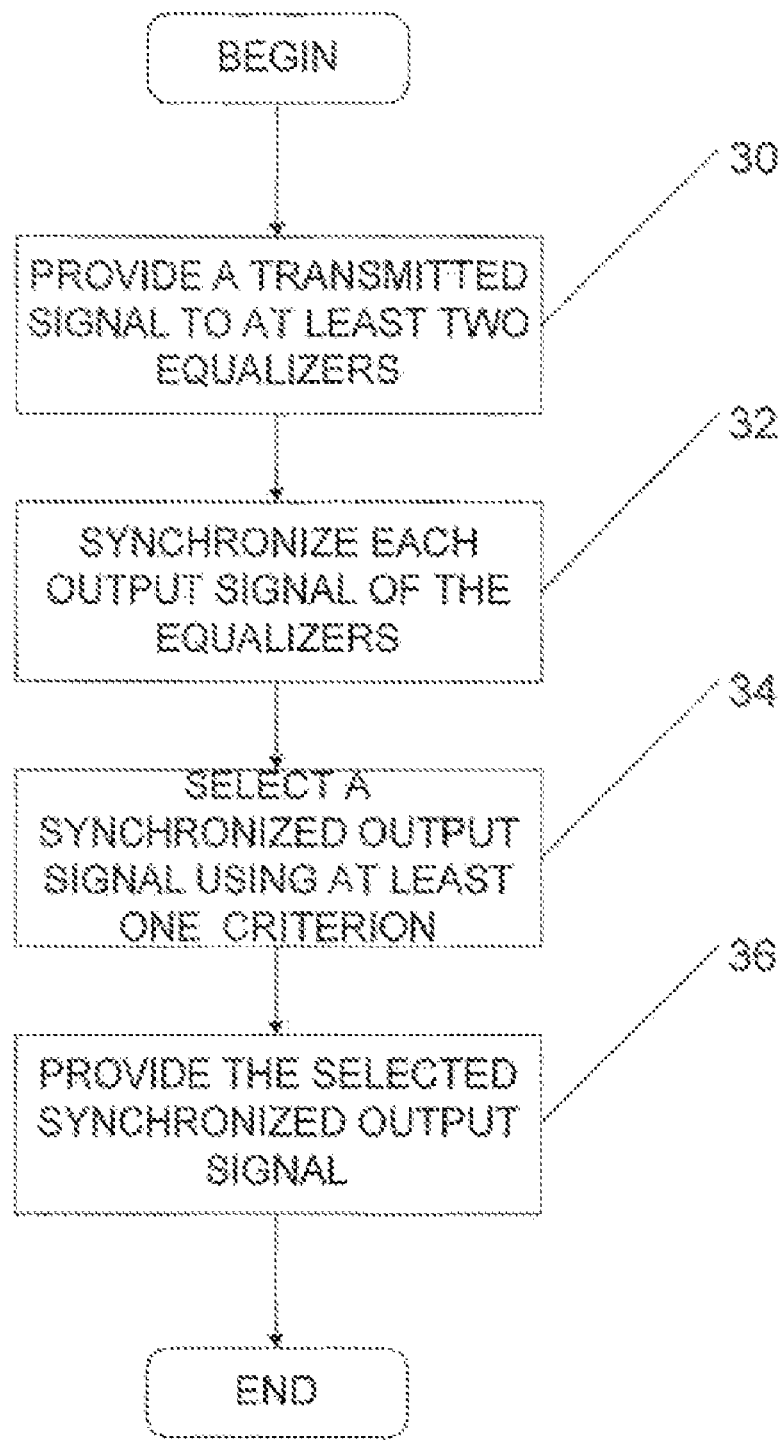
FIG. 2 is a flowchart showing how a multi-equalizer unit operates according to an embodiment.

Now referring to FIG. 2, there is shown how a multi-equalizer operates according to an embodiment.

According to step 30 a transmitted signal is provided to a plurality of equalizers. It will be appreciated that the transmitted signal has been transmitted on a channel having varying characteristics. Each of the equalizers equalizes the received signal using a setting defining an equalizing function.

According to step 32, each output signal of the equalizers is synchronized in time.

According to step 34, a synchronized output signal is selected using at least one transmission performance criterion. As mentioned previously, more than one transmission performance criterion may be used.

Figure 3:
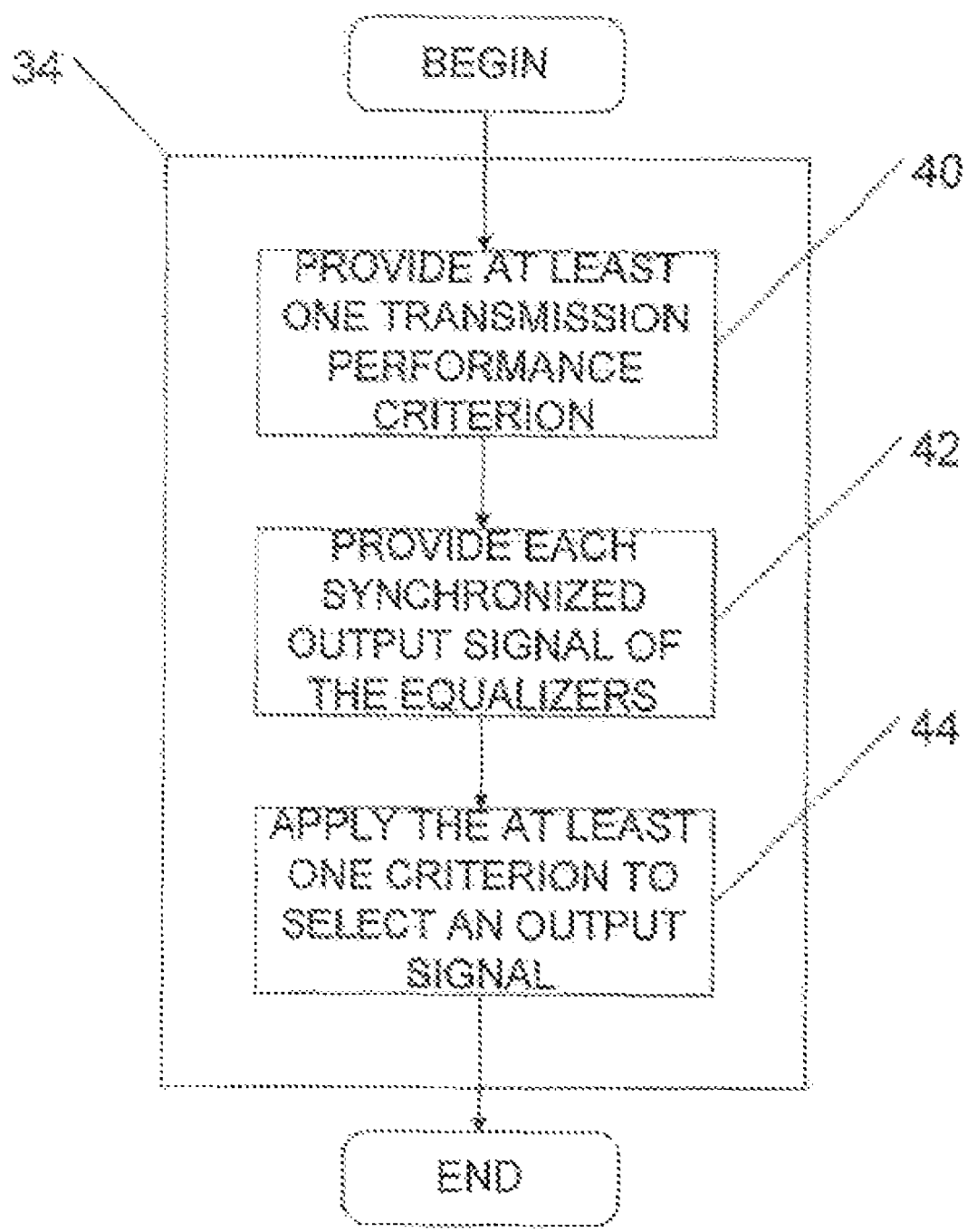
FIG. 3 is a flowchart showing how a synchronized output signal is selected using at least one transmission performance criterion.

Now referring to FIG. 3, there is shown how a synchronized output signal is selected.

According to step 40, at least one transmission performance criterion is provided.

According to step 42, each synchronized output signal of the equalizers is provided.

According to step 44, the at least one transmission performance criterion is applied to each output of the equalizers in order to select an output signal. Alternatively, it will be appreciated that a combination of at least one of the output signals of the equalizers may be selected using the at least one transmission performance criterion, as explained above, to provide a more reliable decision.

Now referring back to FIG. 2 and according to step 36, the selected synchronized output signal is provided.

Figure 4:
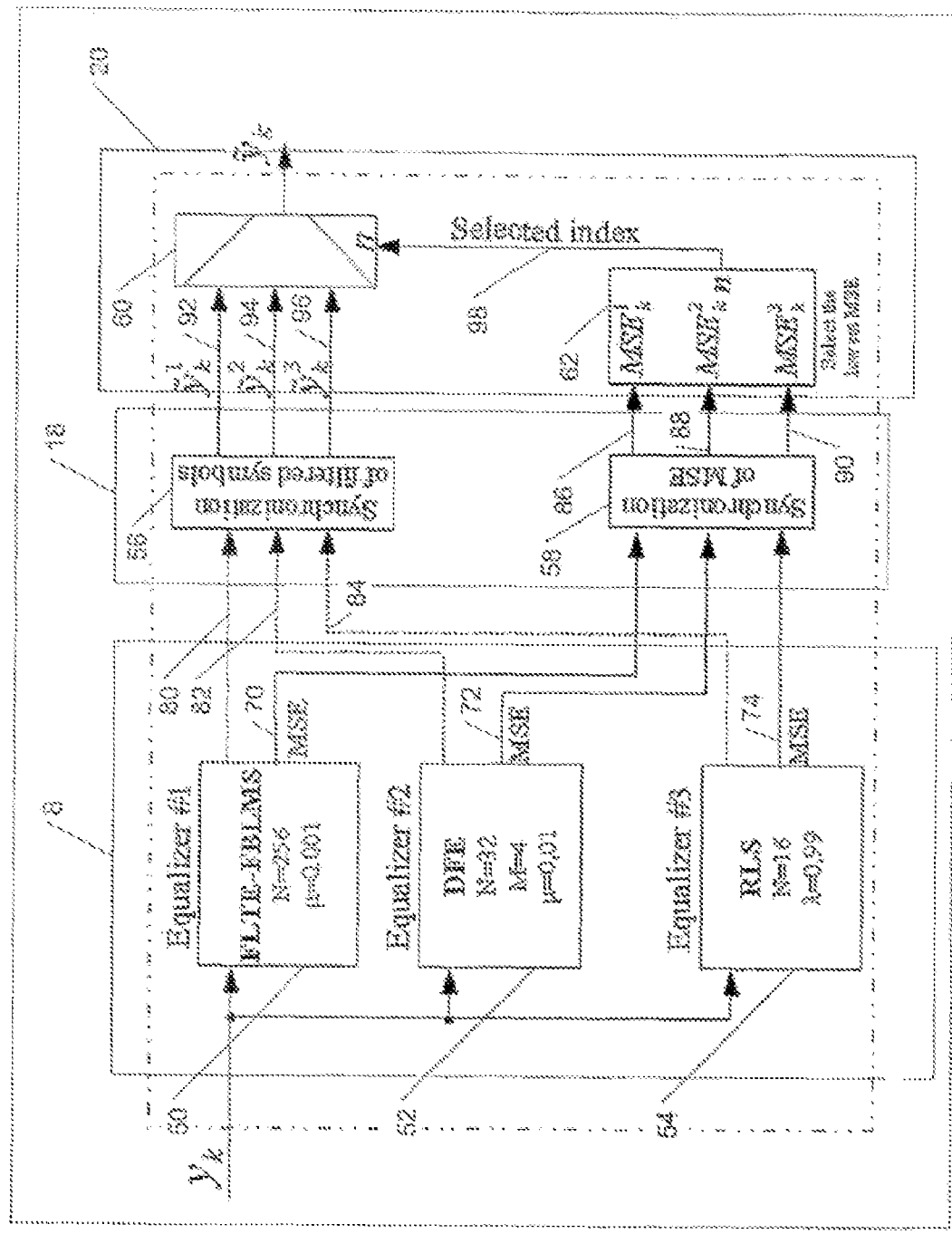
FIG. 4 is a block diagram showing an embodiment of a multi-equalizer unit which comprises three equalizers.

Now referring to FIG. 4, there is shown an example of an embodiment of the multi-equalizer unit 6.

The multi-equalizer unit 6 comprises the plurality of equalizer units 8, the synchronization unit 18 and the decision unit 20.

The plurality of equalizer units 8 comprises a first equalizer 50, a second equalizer 52 and a third equalizer 54.

In this embodiment, the first equalizer 50 has been designed for long echoes. However, when an equalizer is designed in the time domain, the computational complexity increases linearly with the length of the filter. By using Fast Fourier Transform (FFT), it is possible to implement it in the frequency domain. This reduces the number of computations of the algorithm. Radix-2 butterfly FFTs can be considered in order to reduce the complexity. Since the temporal convolution is a multiplication in the frequency domain, the complexity increases logarithmically and permits the implementation of much longer equalizers. For example, with 32 taps, the implementation in frequency is half of the time domain complexity. A frequency linear transversal equalizer (FLTE) with frequency block least mean-square (FBLMS) adaptation with 256 taps for the first equalizer 50 works well. It has been contemplated that longer length could also be used, but this length being about at least ten times greater than a typical time domain equalizer is well suited to demonstrate the usefulness of the complete architecture. With Radix-2 FFTs, the complexity is also ten times less than the equivalent (i.e. same length) linear transversal equalizer (LTE) with an LMS algorithm.

In this embodiment, the second equalizer 52 comprises a shorter decision-feedback equalizer (DFE). Generally, the length of the feedback filter is small. 32 forward taps and 4 feedback taps work well. The complexity of the second equalizer 52 therefore stays amenable. The second equalizer 52 is therefore well suited for shorter impulse response. The convergence of the decision-feedback equalizer (DFE) is also much faster than the convergence of the frequency linear transversal equalizer (FLTE) with frequency block least mean-square (FBLMS). The skilled addressee will appreciate however that the IIR structure may cause a divergence of such a decision-feedback equalizer (DFE).

In this embodiment, the third equalizer 54 comprises a 16-tap recursive least-square (RLS) algorithm. Such a linear equalizer uses a non-linear adaptation algorithm which is different from LMS algorithm of the previous equalizers which use Least Mean Square adaptation. In fact, the Recursive Least Square algorithm is a recursive algorithm which exploits accumulated statistics in order to optimize the convergence of the filter taps. The equalizer is useful when channel conditions vary rapidly in time. Consequently, the RLS impulse response cannot be long.

It will be appreciated that the decision unit 20 operates according to a transmission performance criterion which is based on the smallest mean square error (MSE) of the output of each of the plurality of equalizer units 8. More precisely, at any time k, the output of the equalizer unit having the smallest mean square error is chosen. In this embodiment, the mean square error value is obtained by averaging the error over a limited but significant number of symbols. More precisely, the mean square error value $MSE_k^n$ of an equalizer n is equal to $\lambda \cdot MSE_k^n + (1-\lambda) \cdot |\hat{x}_k - \tilde{y}_k^n|^2$, where $\{x_k\}$ is a modulated symbol stream signal to be transmitted over the multi-path channel, $\{y_k\}$ is the transmitted signal received at the multi-path equalizer unit 6 (therefore also sometimes referred to as the "received signal"), $\{\tilde{y}_k^n\}$ is the output of equalizer n, $\{\hat{x}_k\}$ is an estimated value of the transmitted data. The mean square error value may be computed either with a training sequence or with an estimated value of the transmitted data $\{\hat{x}_k\}$. In one embodiment $\lambda$ has been chosen equal to 0.99 in order to obtain an average on the last 100 error values. It will be appreciated that the computation of the mean square error value is computed by each of the plurality of equalizer units 8.

It should be understood by the skilled addressee that the decision unit 20 may operate according to various embodiments based on distance between an equalized signal and a reference. The reference may be generated using at least one of the usual detected symbols, a statistic of the transmitted signal (such as the average amplitude or a set of higher order moments) and a known training sequence. Furthermore, it should be appreciated that even the mean square error may be computed differently by averaging over disjoint blocks of data or by using a sliding window algorithm for instance.

Moreover, various other transmission performance criteria may be used. For instance, a transmission performance criteria may be provided using channel information provided by a channel estimation unit. In such case, it would be pertinent to favor the use of an equalizer in particular depending on the channel information. Bit Error Rate (BER) data may also be used to generate a transmission performance criterion when a training sequence is used.

The first equalizer 50 therefore provides a first mean square error value signal 70 and a first equalized signal 80.

The second equalizer 52 provides a second mean square error value signal 72 and a second equalized signal 82.

The third equalizer 54 provides a third mean square error value signal 74 and a third equalized signal 84.

The synchronization unit 18 comprises a first synchronization unit 56 and a second synchronization unit 58.

The first synchronization unit 56 receives the first equalized signal 80, the second equalized signal 82 and the third equalized signal 84, performs a time synchronization of the signals and provides a corresponding first synchronized signal 92, a corresponding second synchronized signal 94 and a corresponding third synchronized signal 96.

The second synchronization unit 58 receives the first mean square error value signal 70, the second mean square error value signal 72 and the third mean square error value signal 74 and performs a time synchronization of the received signals to provide a corresponding first synchronized mean square error value signal 86, a corresponding second synchronized mean square error value signal 88 and a corresponding third synchronized mean square error value signal 90.

The decision unit 20 comprises a multiplexing unit 60 and a selecting device 62.

The selecting device 62 receives the first synchronized mean square error value signal 86, the second synchronized mean square error value signal 88 and the third synchronized mean square error value signal 90 and provides an equalizer selection signal 98 representative of the equalizer which has the lowest corresponding synchronized mean square error value. In an embodiment, the equalizer selection signal 98 is and index that is provided to the multiplexing unit 60.

The multiplexing unit 60 receives the first synchronized signal 92, the second synchronized signal 94 and the third synchronized signal 96 and provides one of the received signals according to the equalizer selection signal 98. In the embodiment shown in FIG. 4, the selected index is used for determining which one from the corresponding first synchronized signal 92, the corresponding second synchronized signal 94, and corresponding third synchronized signal 96 will be selected as the output to the multi-equalizer unit 6.

It will be appreciated by the skilled addressee that while some example of equalizer units have been disclosed, other types of equalizer units may be used for the plurality of equalizer units.

It will be appreciated that the multi-equalizer unit 6 may be advantageously used in a software defined radio (not shown). The software defined radio would have, in addition to the multi-equalizer unit, a receiver for receiving a signal transmitted on a channel having varying characteristics (i.e., $\{v_k\}$).

In such a case, the multi-equalizer unit 6 may be implemented in at least one of a Field Programmable Gate Array (FPGA), a Digital Signal Processing Unit (DSP), a Central Processing Unit (CPU), an Application Specific Integrated Circuit (ASIC), Complex Programmable Logic Device (CPLD) or the like. Moreover, it will be appreciated that the plurality of equalizer units 8 may be provided according to various parameters. Also, in an embodiment, at least one of the plurality of equalizer units 8 may be updated/amended depending on channel conditions. The at least one transmission performance criterion may also be updated depending on a specific use.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetical signal.

The embodiments of the invention described above are intended to be exemplary only. The scope of the invention is therefore intended to be limited solely by the scope of the appended claims.

We claim:

1. A multi-equalizer unit for improving signal transmission of a signal transmitted on a channel having varying characteristics, said multi-equalizer unit comprising: at least two equalizers, each for equalizing said transmitted signal to provide a corresponding plurality of symbol signals; a synchronization unit for synchronizing each of said corresponding plurality of symbol signals to produce therefrom a plurality of synchronized signals; and a decision unit for selecting at least one of said plurality of synchronized signals according to at least one transmission performance criterion, corresponding to a synchronized mean square error (MSE) calculated from one of said at least two equalizers.

2. The multi-equalizer as claimed in claim 1, wherein said decision unit is further for selecting said at least one transmission performance criterion.

3. The multi-equalizer as claimed in claim 2, wherein said at least two equalizers are further for calculating, for each of said corresponding plurality of symbol signals, a corresponding mean square error (MSE) over a number symbols of said corresponding plurality of symbol signals, further wherein said decision unit is further for using each one of said corresponding MSE for selecting said at least one transmission performance criterion.

4. The multi-equalizer as claimed in claim 3, wherein said synchronization unit is further for synchronizing each of said corresponding MSE, further wherein said decision unit is further for using each one of said synchronized corresponding MSE for selecting said at least one transmission performance criterion.

5. The multi-equalizer as claimed in claim 3, wherein said synchronization unit comprises a unit for performing synchronization of said symbols.

6. The multi-equalizer as claimed in claim 1, wherein said at least two equalizers comprises a frequency linear transversal equalizer (FLTE) with frequency block least mean square (FBLMS) adaptation, a decision-feedback equalizer (DFE) and a recursive least-square (RLS) algorithm-based equalizer.

7. A method for improving signal transmission of a signal transmitted on a channel having varying characteristics, said method comprising: equalizing said transmitted signal using a plurality of settings defining a plurality of equalizing functions to provide a corresponding plurality of symbol signals; synchronizing each of said corresponding plurality of symbol signals to produce therefrom a plurality of synchronized signals; selecting at least one of the plurality of synchronized signals according to at least one transmission performance criterion, corresponding to a synchronized mean square error (MSE) calculated from one of said at least two equalizers; and providing said selected one of said plurality of synchronized signals.

8. The method as claimed in claim 7, further comprising selecting said at least one transmission performance criterion.

9. The method as claimed in claim 8, further comprising calculating, for each of said corresponding plurality of symbol signals, a corresponding mean square error (MSE) over a number symbols of said corresponding plurality of symbol signals, and further comprising using each one of said corresponding MSE for selecting said at least one transmission performance criterion.

10. The method as claimed in claim 9, further comprising synchronizing each of said corresponding MSE, and further comprising using each one of said synchronized corresponding MSE for selecting said at least one transmission performance criterion.

11. The method as claimed in claim 9, further comprising performing synchronization of said symbols.

12. The method as claimed in claim 7, wherein said plurality of equalization functions comprises a frequency linear transversal equalizer (FLTE) function with frequency block least mean square (FBLMS) adaptation, a decision-feedback equalizer (DFE) function and a recursive least-square (RLS) algorithm-based equalizer function.

13. A software defined radio comprising a receiver for receiving a signal transmitted on a channel having varying characteristics, and a multi-equalizer unit for improving signal transmission of said transmitted signal, said multi-equalizer unit comprising: at least two equalizers, each for equalizing said transmitted signal to provide a corresponding plurality of symbol signals; a synchronization unit for synchronizing each of said corresponding plurality of symbol signals to produce therefrom a plurality of synchronized signals; and a decision unit for selecting at least one of said plurality of synchronized signals according to at least one transmission performance criterion, corresponding to a synchronized mean square error (MSE) calculated from one of said at least two equalizers.

14. The software defined radio as claimed in claim 13, wherein said decision unit is further for selecting said at least one transmission performance criterion.

15. The software defined radio as claimed in claim 14, wherein said at least two equalizers are further for calculating, for each of said corresponding plurality of symbol signals, a corresponding mean square error (MSE) over a number symbols of said corresponding plurality of symbol signals, further wherein said decision unit is further for using each one of said corresponding MSE for selecting said at least one transmission performance criterion.

16. The software defined radio as claimed in claim 15, wherein said synchronization unit is further for synchronizing each of said corresponding MSE, further wherein said decision unit is further for using each one of said synchronized corresponding MSE for selecting said at least one transmission performance criterion.

17. The software defined radio as claimed in claim 15, wherein said synchronization unit comprises a unit for performing synchronization of said symbols.

18. The software defined radio as claimed in claim 13, wherein said at least two equalizers comprises a frequency linear transversal equalizer (FLTE) with frequency block least mean square (FBLMS) adaptation, a decision-feedback equalizer (DFE) and a recursive least-square (RLS) algorithm-based equalizer.

* * * * *